(12) United States Patent
Hilliker (10) Patent No.: US 7,304,810 B2
(45) Date of Patent: Dec. 4, 2007

(54) VIEWING DEVICE AND PACKAGING FOR A VIEWING DEVICE

(75) Inventor: Patrick D. Hilliker, Milton, WI (US)

(73) Assignee: PlayStar, Inc., Janesville, WI (US)

( * ) Notice: Subject to any disclaimer, the term of this patent is extended or adjusted under 35 U.S.C. 154(b) by 99 days.

(21) Appl. No.: 11/207,422

(22) Filed: Aug. 19, 2005

(65) Prior Publication Data

US 2007/0041105 A1    Feb. 22, 2007

(51) Int. Cl.
*G02B 27/02* (2006.01)

(52) U.S. Cl. ...................................... 359/804

(58) Field of Classification Search ................ 359/804, 359/402; 446/219
See application file for complete search history.

(56) References Cited

U.S. PATENT DOCUMENTS

| | | | |
|---|---|---|---|
| 1,635,011 A | 7/1927 | Sadler | |
| 1,837,208 A | 12/1931 | Cover | |
| 4,239,328 A | 12/1980 | Justice, Sr. et al. | |
| D272,924 S | 3/1984 | Sahler | |
| D275,205 S | 8/1984 | Nakayama | |
| 4,770,519 A | 9/1988 | Jacques | |
| 4,868,588 A | 9/1989 | Hajnal | |
| 4,887,893 A | 12/1989 | Dahlgren | |
| 4,911,673 A | 3/1990 | Hollowell | |
| D331,934 S | 12/1992 | Tak | |
| 5,380,234 A * | 1/1995 | Ledford ...................... | 446/223 |
| 5,469,236 A | 11/1995 | Roessel | |
| D365,833 S | 1/1996 | Werner | |
| 5,526,177 A | 6/1996 | Fantone | |
| D374,879 S | 10/1996 | Kung | |
| D390,856 S | 2/1998 | Imahashi | |
| D391,278 S | 2/1998 | Kung | |
| D401,977 S | 12/1998 | Wong | |
| 5,886,839 A | 3/1999 | Arnone et al. | |
| 5,943,163 A | 8/1999 | Tartaglia | |
| D418,187 S | 12/1999 | McLane et al. | |
| 6,079,561 A * | 6/2000 | Burkard ...................... | 206/461 |

(Continued)

FOREIGN PATENT DOCUMENTS

SE          8703712         3/1989

OTHER PUBLICATIONS

The Grandparent's Toy Collection 2003-2004 Catalog, [online], [retrieved on Oct. 12, 2005] Retrieved from Google Catalog Search using Internet URL:http://catalog.google.com/ctalogs?dq=&hl=en &lr=&issue=23917&catpage=30&zoom=1 p. 30.

(Continued)

*Primary Examiner*—Ricky Mack
*Assistant Examiner*—Vipin M Patel
(74) *Attorney, Agent, or Firm*—Michael Best & Friedrich LLP (57) ABSTRACT

A viewing device includes a housing defining an interior chamber through which light can pass. The housing includes first and second spaced apart openings communicating with the interior chamber such that light entering the first opening is viewed by a user looking into the second opening. Indicia representing an eye is positioned adjacent at least one of the openings of the viewing device to help attract consumers to the product and to inform the consumers about the intended use of the product.

22 Claims, 8 Drawing Sheets

U.S. PATENT DOCUMENTS

| | | | | |
|---|---|---|---|---|
| 6,122,100 | A | * | 9/2000 | Miller ........................ 359/402 |
| D434,164 | S | | 11/2000 | Galli |
| D460,771 | S | | 7/2003 | Kung |
| 6,609,942 | B1 | * | 8/2003 | Cole et al. .................... 446/77 |
| D482,710 | S | | 11/2003 | Ho |
| 6,666,454 | B1 | * | 12/2003 | Cole et al. .............. 273/157 R |
| 7,134,926 | B2 | * | 11/2006 | Moeller et al. ................ 441/64 |
| 2001/0013346 | A1 | | 8/2001 | Lemke |

OTHER PUBLICATIONS

U.S. Appl. No. 10/965,080, filed Oct. 14, 2004, Matthew T. Bolland.

Admitted Prior Art Headstrom Periscope (Date Unknown), pp. 1-7.

Admitted Prior Art (Manufacturer Unknown) Yellow Periscope (Date Unknown), pp. 1-4.

Admitted Prior Art Periscopes—PlaysetParts.com (Date Unknown), pp. 1-2.

Admitted Prior Art (Manufacture Unknown) Super Spy Periscope (Date Unknown), p. 1.

* cited by examiner

VIEWING DEVICE AND PACKAGING FOR A VIEWING DEVICE

FIELD OF THE INVENTION

The invention relates to viewing devices, and more particularly to children's viewing toys such as periscope toys, telescope toys, and binocular toys.

BACKGROUND OF THE INVENTION

Viewing devices such as periscope toys, binocular toys, and telescope toys are commonly enjoyed by children. Generally, these toys take the form of a tubular optical instrument containing lenses and/or mirrors. In a periscope toy, the mirrors are arranged to allow the child to look into one portion of the periscope toy that may be generally hidden or obstructed from view and observe objects that would not otherwise be observable from the child's hidden location. Often times, such periscope toys are adapted to be mounted to children's playstations.

SUMMARY OF THE INVENTION

The invention provides a distinctive packaging arrangement and method for a viewing device. The invention provides packaging that both attracts consumers to the product as they pass by and explains the intended use of the product to the consumer via visual indicia or symbols.

More specifically, the invention provides a viewing device including a housing defining an interior chamber through which light can pass. The housing includes first and second spaced apart openings communicating with the interior chamber such that light entering the first opening is viewed by a user looking into the second opening. Indicia representing an eye is adjacent to at least one of the openings. In one embodiment of the invention, the indicia represents a pair of eyes.

In another embodiment, the invention provides a packaged viewing device assembly including the viewing device. Packaging at least partially covers the viewing device, with a portion of the packaging extending over one of the openings. Indicia representing an eye is on the portion of the packaging extending over one of the openings. In one embodiment, the indicia is on the portion of the packaging extending over the first opening. In another embodiment, the indicia includes a decal affixed to a portion of the packaging.

In yet another embodiment, the indicia representing an eye includes first and second sides both having indicia representing an eye such that the indicia representing an eye on the first side is visible to a user looking through the second opening.

In a further embodiment, the housing is also configured to transmit sound entering the second opening toward a sound exit location of the housing at or near the first opening. The viewing device further includes indicia representing a mouth adjacent the second opening.

Other features and advantages of the invention will become apparent to those skilled in the art upon review of the following detailed description, claims, and drawings.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including", "having" and "comprising" and variations thereof herein is meant to encompass the items listed thereafter and equivalents thereof as well as additional items.

DETAILED DESCRIPTION

Figure 1:
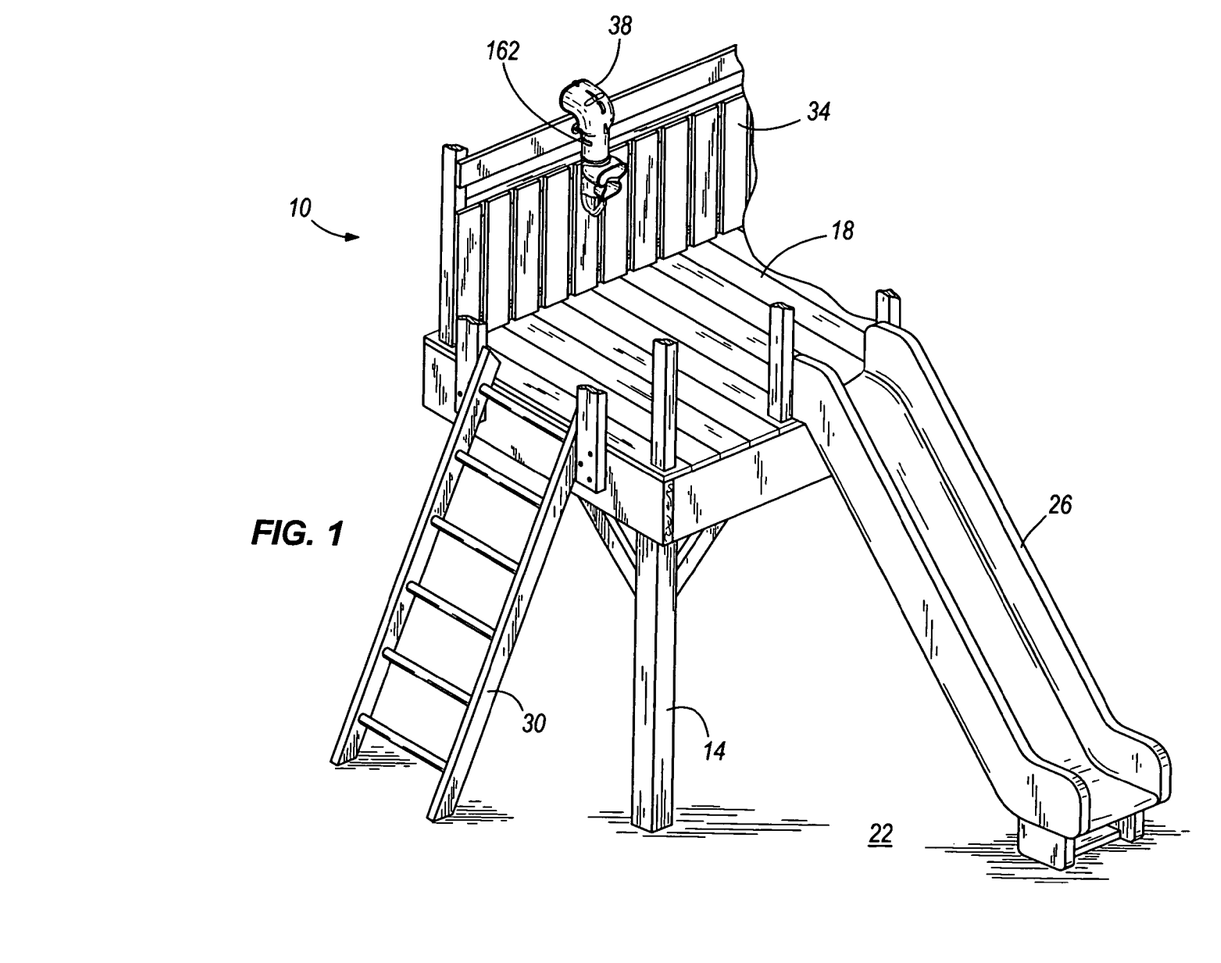
FIG. 1 is a partial perspective view of a playstation including a periscope toy embodying the invention.

FIG. 1 illustrates a playstation 10 of the type typically used by children for recreational play. The playstation 10 includes a plurality of legs 14 (only one is shown) that support an elevated support structure or platform 18 above a lower support surface, such as the ground 22. As shown, a slide 26 may be coupled to the playstation 10 to allow children to slide from the platform 18 down to the ground 22. A climbing ladder 30 is coupled to the playstation 10 to provide a way for children to climb from the ground 22 up to the platform 18. Of course, other configurations of ladders, steps, or climbing panels can also be used. While not shown, other rides and climbing features (e.g., swings, monkey bars, etc.) can also be coupled to the playstation 10.

The illustrated playstation 10 includes a wall 34 supported on the platform 18. A viewing device in the form of a periscope toy 38 is coupled to the wall 34. The periscope toy 38 is of the type described in co-pending U.S. application Ser. No. 10/965,080 filed Oct. 14, 2004, the entire content of which is incorporated by reference herein. As will be explained in greater detail below, the periscope toy 38 enables a child using the playstation 10 to remain generally hidden behind the wall 34 while looking at objects spaced a distance from the playstation 10 that might not otherwise be observable from the child's hidden location behind the wall 34. In addition, the periscope toy 38 enables the child to project sound (e.g., his or her voice) in the direction of the objects being viewed. Of course, and as will also be discussed below, the periscope toy 38 need not be mounted to the wall 34, but can be separately carried and used by a child as desired. Those skilled in the art will understand that the invention can also encompass telescope toys, binocular toys, and other viewing devices.

Figure 4:
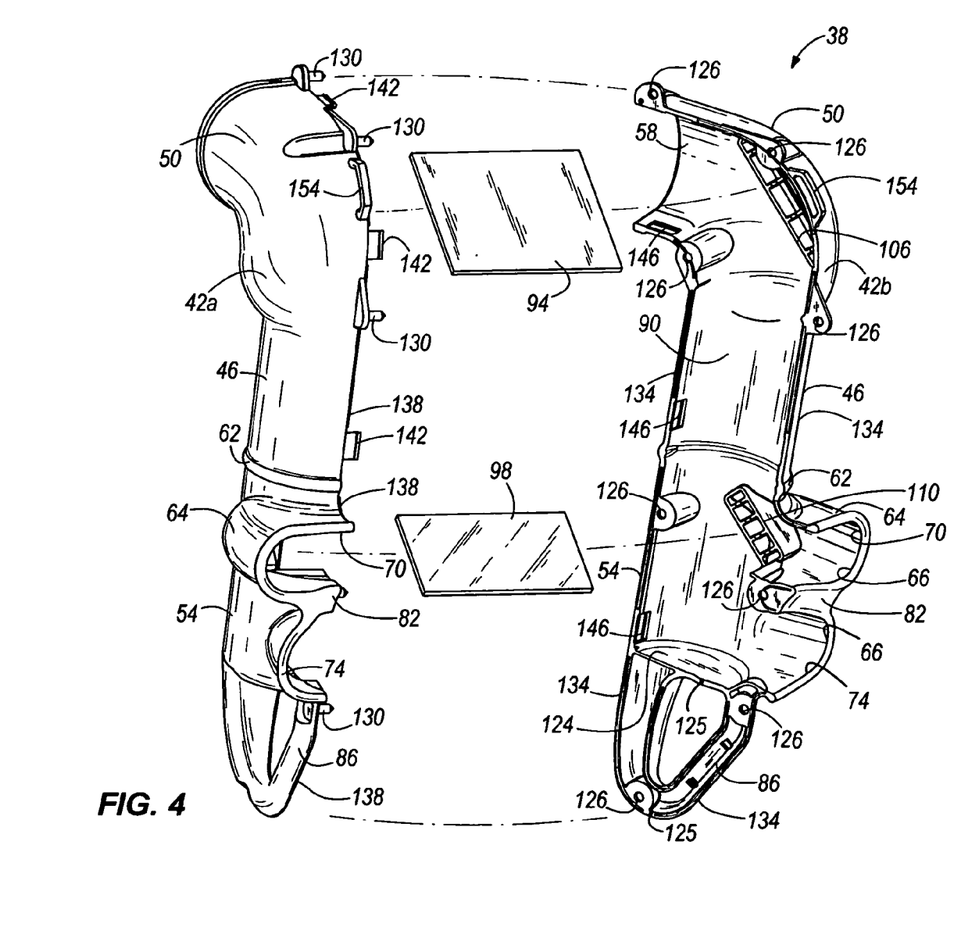
FIG. 4 is an exploded view of the periscope toy of FIG. 1.

Referring now to FIGS. 2-8, the illustrated periscope toy 38 includes a two-piece housing 42 defining first and second housing halves 42a and 42b, respectively (see FIG. 4). For the purposes of discussion, the first half 42a will be referred to as the left half and the second half 42b will be referred to as the right half. The assembled housing 42 defines an intermediate or body portion 46 extending between a first end portion 50 of the housing 42 and a second end portion 54 of the housing 42.

Figure 8:
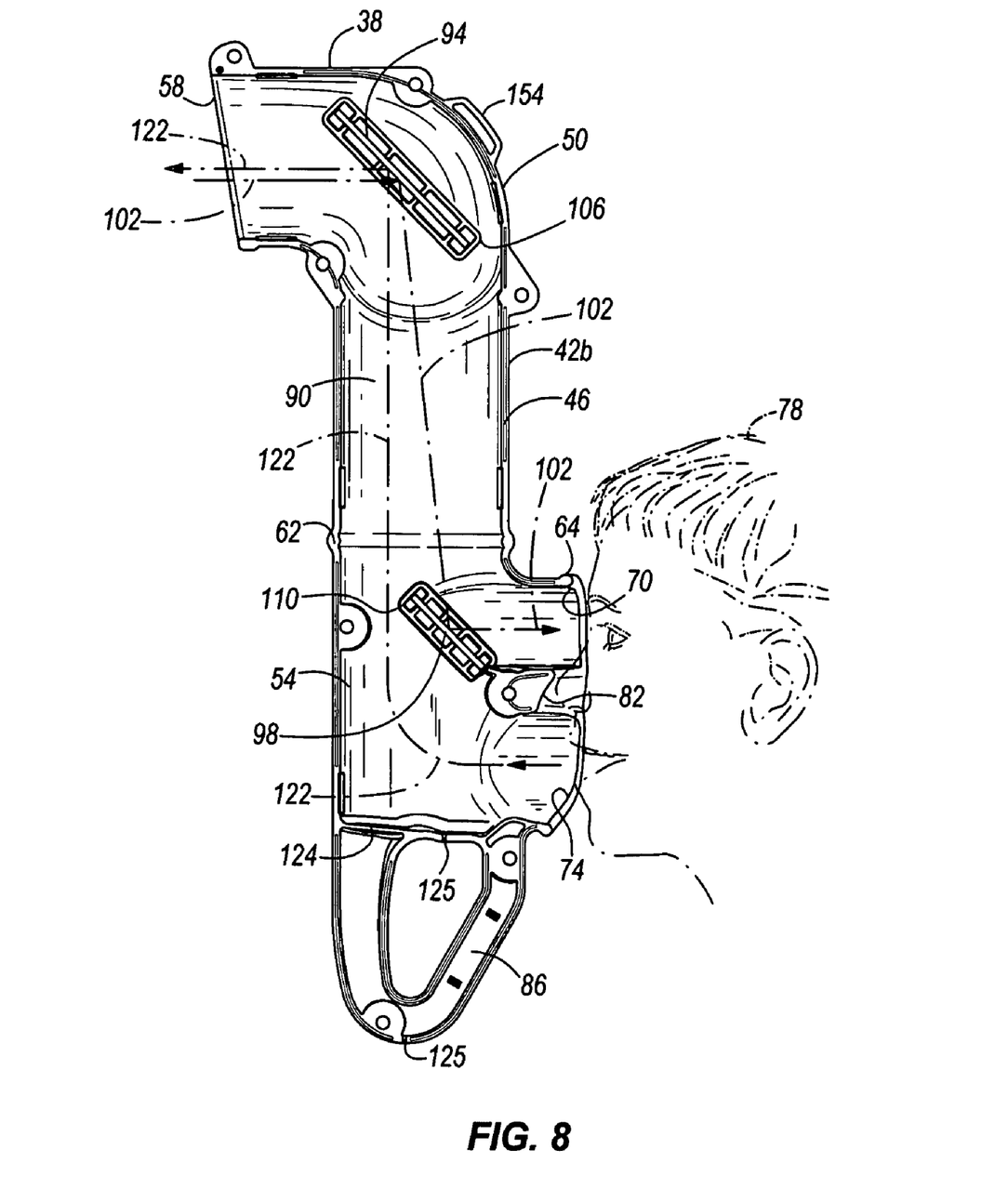
FIG. 8 is a side view of the periscope toy with half of the housing removed to illustrate the light and sound pathways within the periscope toy.

The first end portion 50 of the housing 42 defines an elbow-shaped or bent portion of the housing 42 coupled at one end to the body portion 46 and terminating at the other end in a first opening 58. As best shown in FIG. 8, when the periscope toy 38 is oriented in a generally upright orientation, the first end portion 50 is configured to define an overhang for the first opening 58 to help prevent rain, snow, or falling debris from entering the first opening 58 and collecting within the housing 42.

The body portion 46 is illustrated as being generally cylindrical and extends from the first end portion 50 toward the second end portion 54. In the illustrated embodiment, a raised rib 62 is formed at an interface between the body portion 46 and the second end portion 54. The purpose of the raised rib 62 will be explained in detail below.

The second end portion 54 extends generally coaxially with the body portion 46 and includes an extension portion 64 extending generally perpendicularly to the axis of the body portion 46. The terminal end of the extension portion 64 defines a second opening 66. In the illustrated embodiment, the second opening 66 defines an eyepiece portion or opening 70 and a mouthpiece portion or opening 74 each formed in the extension portion 64 and each respectively sized and configured to enable a user 78 (see FIG. 8) using the periscope toy 38 to look into the eyepiece opening 70 and speak into the mouthpiece opening 74, as will be described in greater detail below.

Figures 2, 3:
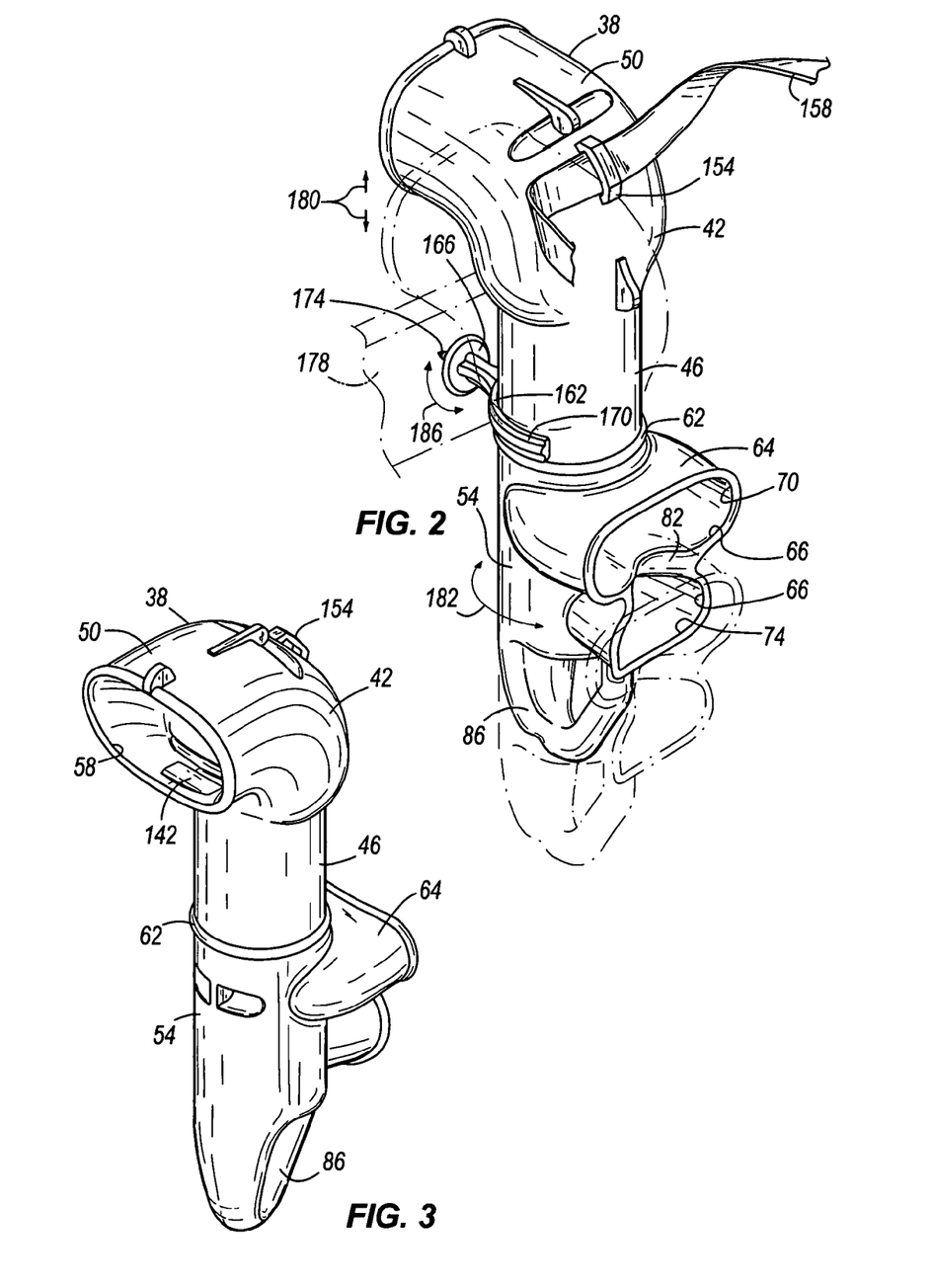
FIG. 2 is a rear perspective view of the periscope toy of FIG. 1.
FIG. 3 is a front perspective view of the periscope toy of FIG. 1.
Figure 6:
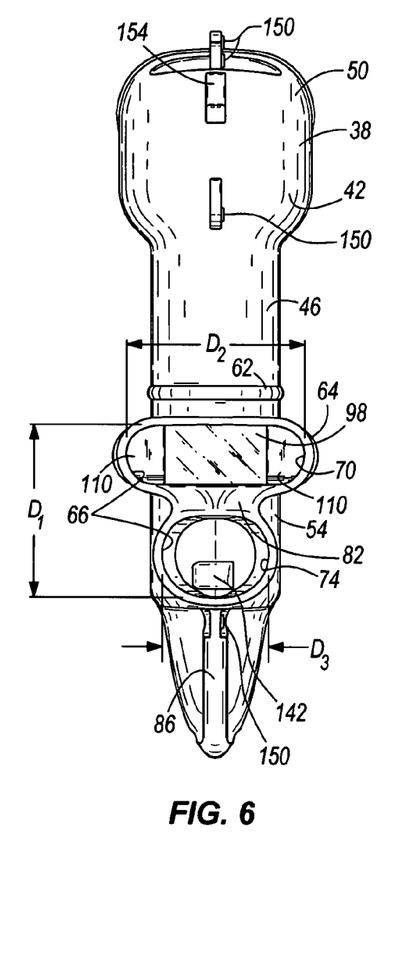
FIG. 6 is a rear view of the periscope toy of FIG. 1.
Figure 7:
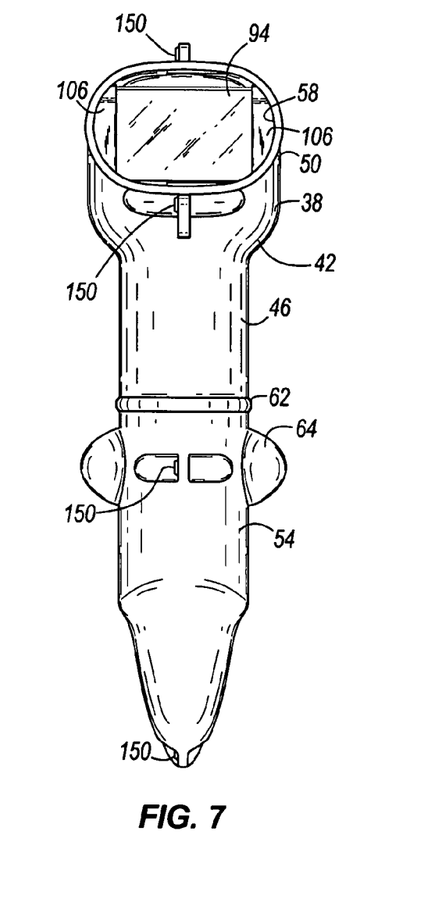
FIG. 7 is a front view of the periscope toy of FIG. 1.

As best shown in FIGS. 2, 4, and 6, a wall portion 82 divides the eyepiece opening 70 and the mouthpiece opening 74. The wall portion 82 is contoured to comfortably receive the nose of the user 78 (see FIG. 8). However, it should be understood that while the illustrated second opening 66 is divided into a separate eyepiece opening 70 sized to substantially surround or accept both of the user's eyes and a separate mouthpiece opening 74 sized to substantially surround or accept the user's mouth, this need not be the case, and a single opening large enough to substantially surround or accept the user's eyes and mouth is also contemplated. As used herein and in the appended claims, the phrase that the opening 66 (or the combined eyepiece opening 70 and mouthpiece opening 74) is "sized to substantially surround" or is "sized to substantially accept" both of the user's eyes and the user's mouth, is intended to mean that the opening is large enough such that when the user 78 positions his or her face closely adjacent the opening 66 as shown in FIG. 8, the user's eyes and mouth are positioned within an area circumscribed by the distal end of the extension portion 64 defining the second opening 66.

With reference to FIG. 6, the second opening 66 defines a distance D1 ranging from about ten centimeters to about twelve centimeters and more preferably from about eleven and one-half centimeters to about twelve centimeters. In the illustrated embodiment, the distance D1 is about 11.7 centimeters. The eyepiece opening 70 defines a distance D2 ranging from about eleven centimeters to about thirteen centimeters, and more preferably from about eleven and one-half centimeters to about twelve and one-half centimeters. In the illustrated embodiment, the distance D2 is about twelve centimeters. The mouthpiece opening 74 defines a distance D3 ranging from about six centimeters to about eight centimeters, and more preferably from about seven centimeters to about eight centimeters. In the illustrated embodiment, the distance D3 is about 7.3 centimeters.

The housing 42 also includes a handle portion 86 adjacent the second end portion 54 to enable the user 78 to manipulate and/or carry the periscope toy 38 as desired. It should be understood that the illustrated handle configuration represents only one possible handle configuration and location. Other common handle configurations and locations, such as a configuration including two oppositely-extending handles or tabs on either side of the housing 42, are also contemplated. Additionally, the handle portion 86 can be completely eliminated so that the user 78 will carry and manipulate the periscope toy without the aid of a handle.

When assembled, the left and right housing halves 42a and 42b define an interior chamber 90 (see FIGS. 4 and 8) that extends between the first opening 58 to the second opening 66. In the illustrated embodiment, the first and second openings 58, 66, (or at least the first opening 58 and the mouthpiece opening 74) are open to allow communication between the interior chamber 90 and the atmosphere. In other words, no covering structure (e.g., a plastic plate or lens) covers or closes the openings 58, 66 in a manner that would inhibit the transmission of sound into or out of the openings 58, 66.

As best illustrated in FIG. 8, the interior chamber 90 defines a non-linear internal passageway. In other words, there is substantially no straight-line path from the first opening 58 to the second opening 66 through the interior chamber 90. In order for light and sound to travel between the first and second openings 58, 66, the light and sound must be re-directed at least once, and in the illustrated construction, must be re-directed at least two times. Of course, if the viewing device takes the form of a telescope toy or binocular toy, the light and sound need not be re-directed within the housing at all, but rather can pass through along a generally linear pathway (taking into account of course any minor bending or re-directing of the light associated with a magnification process, if any).

The periscope toy 38 is operable to enable a user 78 to look into the eyepiece opening 70 to see objects visible due to light entering the first opening 58. To direct the light rays from the first opening 58 to the eyepiece opening 70, the illustrated periscope toy 38 includes first and second light directing members in the form of mirrors 94 and 98, respectively. The mirrors 94, 98 are retained between the halves 42a and 42b of the housing 42 at the appropriate orientation to direct light along the pathway generally depicted by the dashed lines 102 in FIG. 8. Light entering the first opening 58 strikes the mirror 94 and is re-directed toward the second end portion 54 of the housing 42. The light continues to travel through the interior chamber 90 and is received by the mirror 98 and further directed toward the eyepiece opening 70. In the illustrated embodiment, the mirrors 94, 98 are made from material sold under the trademark Lexan. Mirrors made from this material have proven to be durable and resistant to the elements (e.g., resistant to "yellowing" due to exposure to the sun). However, other suitable materials for the mirrors 94, 98 can also be used.

It should also be understood that while in the illustrated embodiment the light directing members are mirrors 94 and 98, other light directing members (e.g., lenses, prisms, filters, and the like) known for reflecting, directing, magnifying, transmitting, or focusing light can be substituted for or used in conjunction with the mirrors 94, 98. For example, if the viewing device takes the form of a telescope or binocular toy, it may include one or more lenses to magnify the light. Alternatively, some telescope or binocular toys simply include clear plastic lenses that do not actually magnify the light, but rather only transmit the light. Nonetheless, these toys resemble telescopes or binoculars. As used herein and in the appended claims, when used to describe action taken with light, the terms "direct" and "directing" encompasses guiding the light, reflecting the light, magnifying the light, focusing the light, or allowing the light to transmit or pass through.

Figure 5:
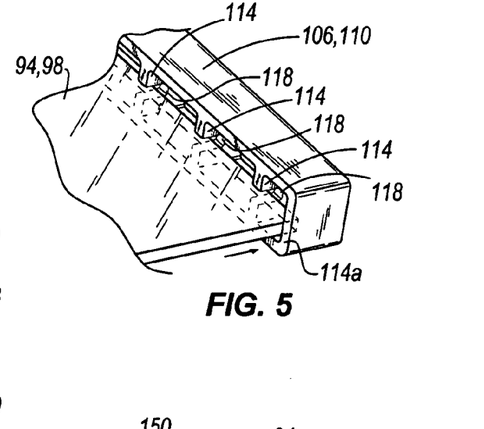
FIG. 5 is an enlarged partial view illustrating a mirror mount within the periscope toy.

As best shown in FIGS. 4, 5, and 8, each housing half 42a, 42b includes first and second mirror mounts 106 and 110, respectively, for receiving and supporting an edge of the respective mirror 94, 98. In the illustrated embodiment, the mirror mounts 106, 110 are integrally formed with the housing halves 42a, 42b and each includes a plurality of parallel ribs 114. With reference to FIG. 5, except for at least one end rib 114a on any given mount 106, 110, each rib 114 includes a notch or recess 118 formed therein for receiving an edge of the mirror 94, 98. The notch-less end ribs 114a substantially prevent the mirrors 94, 98 from sliding within the mounts 106, 110.

The periscope toy 38 is also configured to enable the user 78 to project sound toward the objects being viewed. Therefore, the periscope toy 38 includes means for simultaneously transmitting light and sound in opposite directions along respective paths within the housing 42 such that light entering the first end portion 50 of the housing 42 is transmitted to the second end portion 54 of the housing 42, and sound entering the second end portion 54 of the housing 42 is transmitted to the first end portion 50 of the housing 42. The mouthpiece opening 74 allows a user 78 to speak, yell, or otherwise vocalize into the periscope toy 38 simultaneously with viewing. The sound generated by the user 78 enters the second end portion 54 of the housing 42 through the mouthpiece opening 74, passes behind the mirror 98, and travels through the interior chamber 90 generally along the non-linear pathway depicted by the dashed lines 122 in FIG. 8. Again, if the viewing device takes the form of a telescope toy or binocular toy, the sound need not be re-directed within the housing at all.

In the illustrated embodiment, the mirror mounts 110 are positioned to minimize or eliminate any gap between the bottom edge of the mirror 98 and the wall portion 82 separating the eyepiece opening 70 and the mouthpiece opening 74. This substantially prevents sound introduced by the user 78 from immediately exiting the housing 42 via the eyepiece opening 70. Furthermore, the housing 42 includes a wall portion 124 that separates the handle portion 86 from the remainder of the interior chamber 90 so that sound introduced into the second opening 66 is directed toward the first opening 58 and not into the handle portion 86. Drains 125 in the wall portion 124 and the handle portion 86 allow any water that enters into the interior chamber 90 to drain from the housing 42.

While the illustrated periscope toy 38 is configured such that the light and sound both travel through a common, substantially undivided interior chamber 90, those skilled in the art will understand that separate interior chambers could be formed within the housing 42 such that the light travels through a first chamber and the sound travels through a second chamber. The two separate chambers could be formed by placing a baffle in the illustrated interior chamber 90, or could be formed using two distinct, yet interconnected tubular housings. Additionally, those skilled in the art will understand that while the illustrated periscope toy 38 allows the sound to exit the housing 42 via the first opening 58, the sound could alternatively be routed to exit at an alternative sound exit location distinct from, yet near, the first opening 58 (e.g., through an opening positioned below the first opening 58).

Assembly of the periscope toy 38 will now be described. The mirrors 94 and 98 are positioned adjacent their respective mirror mounts 106 and 110 such that when the housing halves 42a and 42b are brought together, the mirrors are captured and retained in position between the housing halves 42a, 42b without the need for glue or other bonding agents.

The housing halves 42a, 42b are designed with several features that facilitate aligning and securing the two housing halves together. In the illustrated embodiment, and as best seen in FIG. 4, the right housing half 42b includes a plurality of apertures 126 formed at various locations about the perimeter of the housing half 42b. The apertures 126 are positioned and configured to receive a plurality of corresponding posts 130 formed on the left housing half 42a. With the posts 130 received in the apertures 126, the housing halves 42a and 42b are moved together. The engagement of the posts 130 within the apertures 126 guides the housing halves 42a, 42b together.

The right housing half 42b further includes a plurality of grooves 134 formed along the perimeter. The grooves 134 receive corresponding tongue portions 138 extending from the perimeter of the left housing half 42a when the halves 42a, 42b are brought together. While not shown, the right housing half 42b can also include additional recesses that receive corresponding projections in the left housing half 42a at various other locations around the perimeter of the housing halves 42a, 42b. For example, such features can be positioned adjacent the openings 58, 70, and 74.

Furthermore, the left housing half 42a includes a plurality of resilient tabs 142 that extend into and engage corresponding notches 146 formed in the right housing half 42b. Together, all of these features aid in alignment and securement of the two housing halves 42a, 42b together. Of course, those skilled in the art will understand that other types of alignment and securement features can be substituted for or used in addition to the illustrated features.

Once the housing halves 42a, 42b are assembled together, they can be secured by ultrasonically welding or thermally staking each post 130 into a button-shaped head 150 (see FIGS. 6 and 7) that is larger than the apertures 126 so that the halves 42a, 42b cannot be separated. Of course, other suitable techniques can also be used to deform the posts 130 into the button-shaped heads 150.

With this method, the housing halves 42a, 42b can be secured together without requiring gluing or bonding along the mating perimeters of the housing halves 42a, 42b. In the illustrated embodiment, this assembly method is useful because it facilitates the use of molded, high-impact polypropylene plastic, which is extremely durable and well-suited for withstanding the anticipated use and abuse by children using the periscope toy 38, but which is not particularly suitable for gluing. Of course, other means for assembling the housing halves 42a, 42b are also contemplated, and other suitable plastic materials can be used, which may require modifications to the assembly method and alignment/securement features discussed above. For example, other plastic materials that are more receptive to gluing or other bonding methods could be used, and the mating perimeter halves could be bonded together.

As mentioned above, the housing halves 42a, 42b are made from molded plastic. In the illustrated embodiment, the housing 42 includes an integrally molded loop 154 configured to receive an optional carrying strap 158 (see FIG. 2). The molds used to create the housing halves 42a, 42b can be interchangeably altered as desired to form or eliminate the loop 154 during molding. Of course, the loop could also be a separate part attached to the housing 42 after the molding process.

While the periscope toy 38 can be carried via the handle portion 86 or the carrying strap 158, it can also be mounted to a playstation 10 or other suitable support structure as shown in FIGS. 1 and 2. Referring to FIG. 2, a mounting member 162 includes a base portion 166 and a U-shaped portion 170 coupled to the base portion 166. A fastener such as a lag bolt 174 is received within a bore (not shown) in the base portion 166 and can be secured into a support member 178.

The body portion 46 of the housing 42 is sized to snap into the U-shaped portion 170 of the mounting member 162 to support the periscope toy 38 in the mounted mounting member 162. As illustrated in FIG. 2, when the periscope toy 38 is mounted in the mounting member 162, the periscope toy can translate between a first position (shown in solid lines in FIG. 2) and a second position (shown in phantom lines in FIG. 2) as indicated by the arrows 180. The enlargement of the first end portion 50 with respect to the diameter of the body portion 46 provides a first stop for translation of the housing 42 within the mounting member 162, and the raised rib 62 provides a second stop for translation of the housing 42 within the mounting member 162. In an alternative construction, the raised rib 62 could be eliminated and the extension portion 64 would act as the second stop.

The engagement between the U-shaped portion 170 of the mounting member 162 and the body portion 46 also permits rotation of the housing 42 within the mounting member 162 as indicated by the arrows 182. This rotation capability greatly expands the viewing field and sound directing options for the periscope toy 38. Furthermore, if the lag bolt 174 is not secured too tightly, the mounting member 162 can also be pivoted with respect to the support member 178 as indicated by the arrows 186. This pivoting capability also expands the viewing field and sound directing options for the user 78. While the mounting member 162 provides great flexibility for mounting and using the periscope toy 38, it is to be understood that other suitable mounting devices and arrangements can also be substituted.

It should also be understood that the periscope toy 38 of the present invention can be modified to various other configurations without deviating from the scope of the invention. Specifically, while the housing 42 is configured and oriented in the generally upright orientation as shown in the figures, it could also be reconfigured and reoriented as desired to provide different viewing and sound projecting arrangements. For example, it may be desired to simply include one bend in the periscope toy 38 such that only a single mirror is needed to direct the light through the interior chamber. Alternatively, the periscope toy could be reconfigured to include more than two bends, requiring more than two mirrors. In another alternate configuration, the periscope toy could be reoriented such that the user views and speaks into the upper end of the periscope toy to view objects and direct sound through an opening below the user's eyes and mouth. Additionally, the invention can also be embodied in a telescope toy or a binocular toy, as mentioned and explained above.

Figure 9:
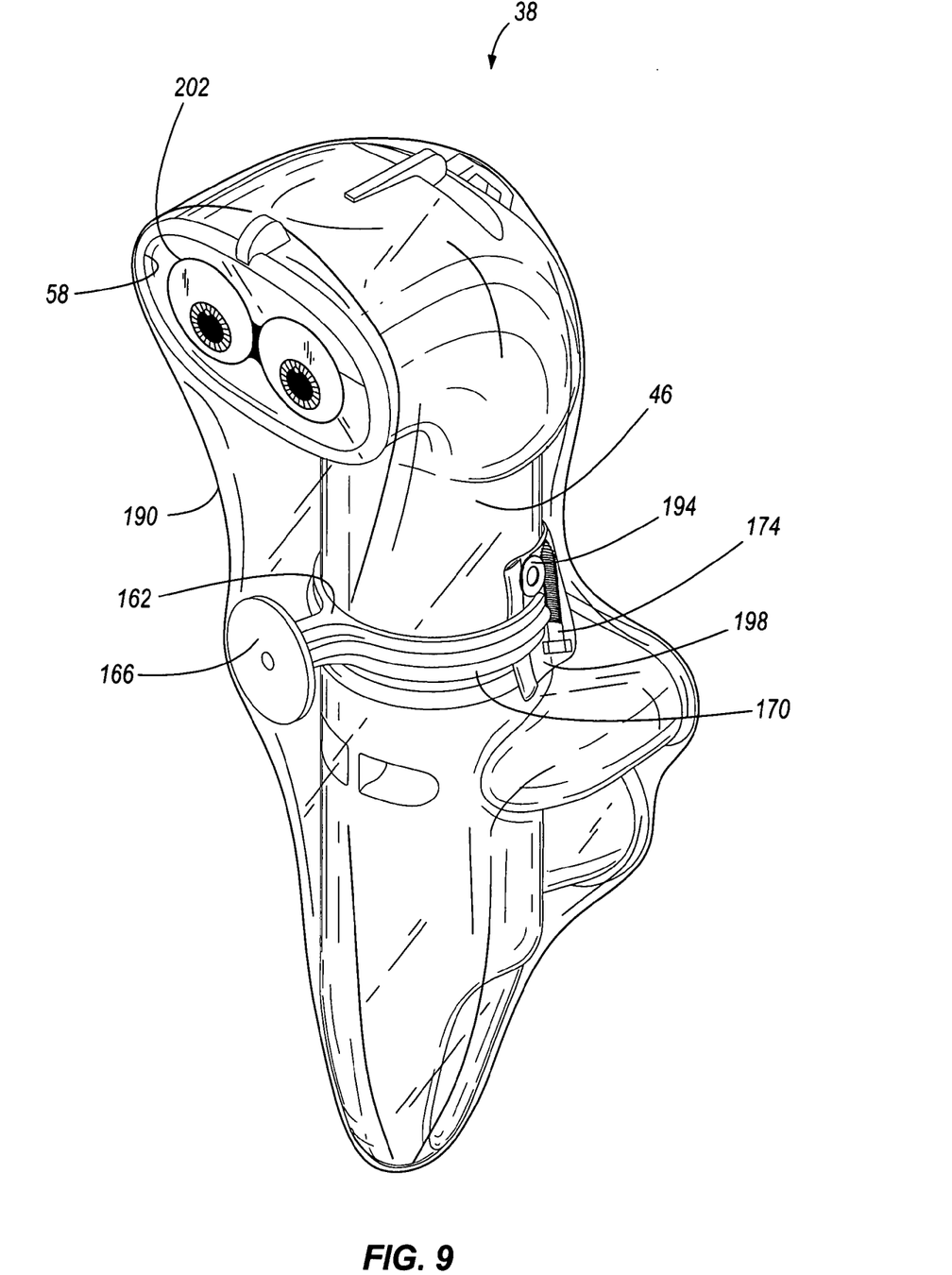
FIG. 9 is a perspective view of one embodiment of the packaged periscope toy of FIG. 1.
Figure 10:
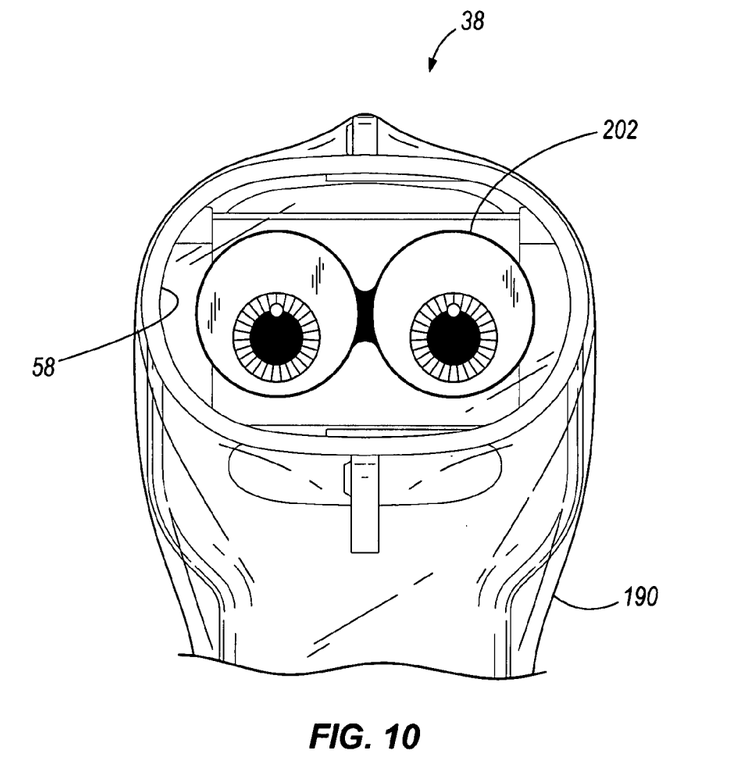
FIG. 10 is an enlarged front view of a portion of the packaged periscope toy of FIG. 9.

FIGS. 9 and 10 illustrate one embodiment of the packaged periscope toy 38. It should be understood, however, that the packaging can similarly be applied to other embodiments of periscope toys, to telescope toys, to binocular toys, or any other viewing devices or toys. The protective packaging takes the form of a covering 190 over at least a portion of at least one of the openings 58, 66 of the periscope toy 38. In the illustrated embodiments (see FIGS. 9-10 and 12-13), the entire periscope toy 38 is enclosed by the covering 190, which includes a transparent heat sensitive shrink wrap. Of course, other products that provide a partial or complete packaging covering 190 for the periscope toy 38 can also be used (e.g., clamshell packaging, bags, boxes, and the like). The material of the covering 190 may be translucent, or alternatively, the material may be opaque. In the illustrated embodiment the covering 190 is substantially transparent.

Figure 12:
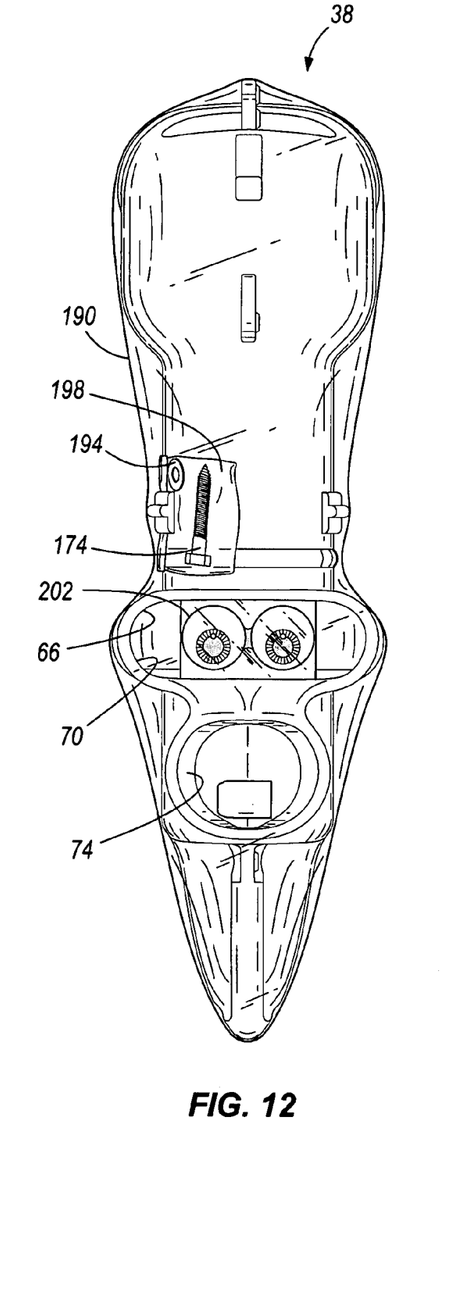
FIG. 12 is a rear view of the packaged periscope toy of FIG. 9 illustrating the eye indicia being visible through the periscope toy.
Figure 13:
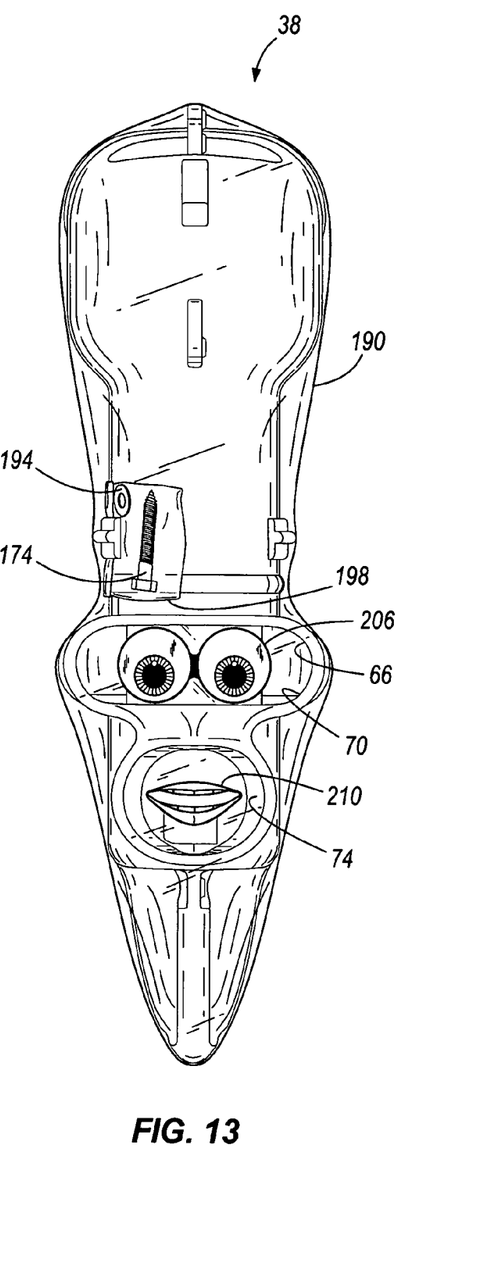
FIG. 13 is another embodiment of a packaged periscope toy.

As can be seen in FIGS. 9, 12, and 13, the mounting member 162 is positioned in place on the body portion 46 of the periscope toy 38 such that the protective covering 190, when shrunk, overlays and covers the base portion 166. The lag bolt 174 and a washer 194 are contained within a hardware bag 198 that can be secured between the U-shaped portion 170 and the body portion 46.

As shown in FIGS. 9 and 10, the protective package or covering 190 includes indicia representing an eye 202 adjacent the first opening 58. The eye indicia 202 may take various shapes, forms, and styles representing an eye, all of which are considered herein. The eye indicia 202 may include a single eye or a pair of eyes. Eye indicia representing a pair of eyes may be either two separate components or a single component including two eyes. In the illustrated embodiment, the eye indicia 202 is positioned on the covering and over the first opening 58. The eye indicia 202 situated in this manner attracts consumers' attention to the packaged periscope toy 38 as they pass by in a retail store or elsewhere. Additionally, the eye indicia 202 clearly and visually explains the intended use of the periscope toy 38 to the consumer, letting them know the periscope toy 38 is a viewing device.

The eye indicia 202 can take the form of one or more decals affixed to the covering 190, or can be printed directly on the covering 190 using any suitable printing methods. Other manners of creating the eye indicia 202 are also contemplated. While in the illustrated embodiment the eye indicia 202 is placed on the covering 109 after the covering 109 is positioned over the periscope toy 38, the eye indicia 202 could also be placed on the covering 109 prior to packaging the periscope toy 38.

Figure 11:
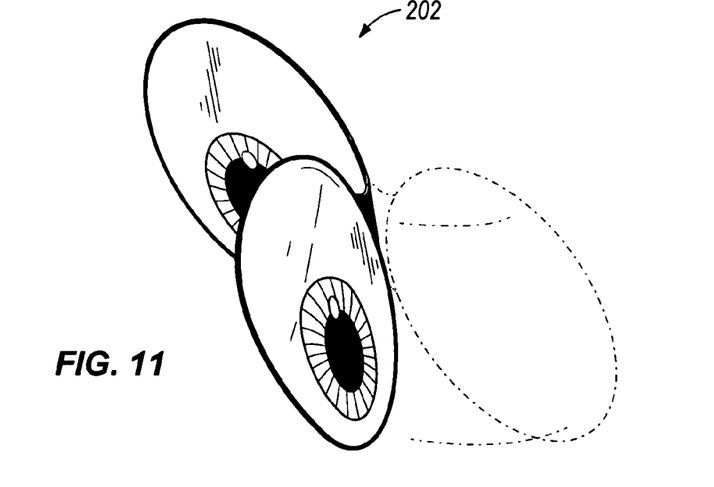
FIG. 11 is a perspective view illustrating the double-sided eye indicia of one embodiment of the invention.

FIGS. 11 and 12 illustrate a double-sided version of the eye indicia 202. The double-sided nature allows the eye indicia 202 to be visible over the first opening 58 (see FIG. 10) and also to be visible by a user looking through the second opening 66 (see FIG. 12). FIG. 11 shows one embodiment of the double-sided eye indicia 202 in the form of a decal that can be affixed to the covering 190 via a suitable adhesive. The decal has eye indicia 202 printed on both sides.

FIG. 13 illustrates an alternative embodiment of a packaged periscope toy 38 including eye indicia 206 adjacent the second opening 66, and more specifically over the eyepiece portion 70 of the second opening 66. Similar to the eye indicia 202 discussed in FIGS. 9-12, the eye indicia 206 can take substantially any form and may include a single eye or a pair of eyes. In the illustrated embodiment, the eye indicia 206 is affixed to or otherwise placed on a portion of the covering 190 over the eyepiece opening 70.

The embodiment of FIG. 13 further includes indicia representing a mouth 210 adjacent the second opening 66. The mouth indicia 210 may take on various forms of representation of a mouth and is positioned over the mouthpiece opening 74 and on the covering 190. By positioning the mouth indicia 210 in this manner, the mouth indicia 210 again helps attract consumers' attention to the periscope toy 38 as they pass by. Additionally, the mouth indicia 210 lets the consumers know that the periscope toy 38 is more than just a viewing device in that it also contemplates the user speaking or shouting into the mouthpiece opening 74, thereby visually explaining the intended use of the periscope toy 38. The mouth indicia 210 may be utilized with or without the eye indicia 202, 206 adjacent at least one of the openings 58, 66 of the periscope toy 38. As with the eye indicia 202, 206, the mouth indicia 210 can take the form of a decal, can be directly printed on the covering 190, or can take any other suitable form.

Various features of the invention are set forth in the following claims.

The invention claimed is:

1. A viewing device comprising:
a housing defining an interior chamber through which light can pass, and including first and second spaced apart openings communicating with the interior chamber such that light entering the first opening is viewed by a user looking into the second opening; and
indicia representing an eye adjacent at least one of the openings, the indicia initially positioned and configured to substantially obstruct a users's view upon looking into the second opening, the indicia being subsequently irreplaceably removed from adjacent the at least one of the openings to permit a user to use the viewing device for its intended purpose.

2. The viewing device of claim 1, wherein the indicia representing an eye is adjacent the first opening.

3. The viewing device of claim 2, wherein the indicia representing an eye is positioned over the first opening.

4. The viewing device of claim 3, wherein the indicia representing an eye includes first and second sides both having indicia representing an eye such that the indicia representing an eye on the first side is visible to a user looking through the second opening.

5. The viewing device of claim 4, wherein the indicia representing an eye is positioned over the second opening.

6. The viewing device of claim 1, wherein the indicia representing an eye is adjacent the second opening.

7. The viewing device of claim 1, wherein the indicia represents a pair of eyes.

8. The viewing device of claim 1, further comprising a covering having a portion extending at least partly over one of the openings, the indicia representing an eye being on the portion of the covering extending at least partly over one of the openings such that removal of the covering irreplaceably removes the indicia from over the one of the openings to permit a user to use the viewing device for its intended purpose.

9. The viewing device of claim 8, wherein the portion of the covering is translucent.

10. The viewing device of claim 8, wherein the indicia representing an eye is printed on the portion of the covering.

11. The viewing device of claim 8, wherein the indicia representing an eye includes a decal affixed to the portion of the covering.

12. The viewing device of claim 8, wherein the covering is part of a protective packaging surrounding the viewing device, the protective packaging being removed from around the viewing device to irreplaceably remove the indicia from over the one of the openings.

13. The viewing device of claim 1, wherein the second opening is further configured to receive sound created by the user, the interior chamber of the housing configured to both transmit the light from the first opening to the second opening and to transmit the sound entering the second opening toward a sound exit location of the housing at the first opening.

14. The viewing device of claim 13, further comprising indicia representing a mouth adjacent the second opening.

15. The viewing device of claim 14, wherein the indicia representing a mouth is on a covering extending at least partially over the second opening.

16. A packaged viewing device assembly comprising:
a viewing device including a housing defining an interior chamber through which light can pass, and including first and second spaced apart openings communicating with the interior chamber such that light entering the first opening is viewed by a user looking into the second opening;
packaging at least partially covering the viewing device, a portion of the packaging extending over one of the openings; and
indicia representing an eye on the portion of the packaging extending over one of the openings, the indicia initially positioned and configured to substantially obstruct a user's view upon looking into the second opening, the packaging and the indicia being subsequently irreplaceably removed from over the one of the openings to permit a user to use the viewing device for its intended purpose.

17. The packaged viewing device assembly of claim 16, wherein the indicia is printed on the portion of the packaging.

18. The packaged viewing device assembly of claim 16, wherein the indicia includes a decal affixed to the portion of the packaging.

19. The packaged viewing device assembly of claim 16, wherein the indicia is on the portion of the packaging extending over the first opening.

20. The packaged viewing device assembly of claim 16, wherein the indicia representing an eye includes first and second sides both having indicia representing an eye such that the indicia representing an eye on the first side is visible to a user looking through the second opening.

21. A viewing device, comprising:
a housing defining an interior chamber through which light can pass, and including first and second spaced apart openings communicating with the interior chamber such that light entering the first opening is viewed by a user looking into the second opening; and
indicia representing an eye adjacent at least one of the openings;
wherein the second opening is further configured to receive sound created by the user, the housing configured to transmit the sound entering the second opening toward a sound exit location of the housing at or near the first opening; and
further comprising indicia representing a mouth adjacent the second opening.

22. The viewing device of claim 21, wherein the indicia representing a mouth is on a covering extending at least partially over the second opening.

* * * * *